United States Patent [19]
Woodward

[11] Patent Number: 6,116,022
[45] Date of Patent: *Sep. 12, 2000

[54] CATALYTIC REACTOR FOR MARINE APPLICATION

[75] Inventor: Lee A. Woodward, Racine, Wis.

[73] Assignee: Outboard Marine Corporation, Waukegan, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/675,196

[22] Filed: Jul. 3, 1996

[51] Int. Cl.⁷ ........................................ F01N 3/10
[52] U.S. Cl. ........................ 60/300; 60/299; 60/303; 60/320; 60/289; 422/174; 422/180
[58] Field of Search .................... 60/299, 300, 301, 60/302, 303, 320, 289; 422/179, 180, 174

[56] References Cited

U.S. PATENT DOCUMENTS

| | | | |
|---|---|---|---|
| 3,441,381 | 4/1969 | Keith et al. | 422/173 |
| 3,645,093 | 2/1972 | Thomas | 422/168 |
| 3,665,711 | 5/1972 | Muroki | 422/173 |
| 3,692,497 | 9/1972 | Keith et al. | 422/173 |
| 3,710,575 | 1/1973 | Lamm | 422/173 |
| 3,817,714 | 6/1974 | Wiley | 422/173 |
| 3,820,327 | 6/1974 | Henault | 60/286 |
| 3,839,535 | 10/1974 | Ashburn . | |
| 3,854,888 | 12/1974 | Frietzsche et al. | 422/179 |
| 3,861,881 | 1/1975 | Nowak | 422/179 |
| 3,872,667 | 3/1975 | Rosenlund | 422/173 |
| 3,892,537 | 7/1975 | Gulati et al. | 422/179 |
| 3,967,929 | 7/1976 | Tamazawa et al. | 23/288 |
| 4,049,388 | 9/1977 | Scheitlin et al. | 422/171 |
| 4,190,629 | 2/1980 | Strachan | 422/173 |
| 4,218,422 | 8/1980 | Schock et al. | 422/171 |
| 4,238,456 | 12/1980 | Jalbing | 422/172 |
| 4,256,700 | 3/1981 | Smith et al. | 422/171 |
| 4,278,639 | 7/1981 | Tadokoro et al. | 422/171 |
| 4,285,909 | 8/1981 | Mizusawa et al. | 422/179 |
| 4,328,187 | 5/1982 | Musall et al. | 422/179 |
| 4,335,077 | 6/1982 | Santiago et al. | 422/179 |
| 4,335,078 | 6/1982 | Ushijima et al. | 422/171 |
| 4,347,219 | 8/1982 | Noritake et al. | 422/180 |
| 4,353,872 | 10/1982 | Midorikawa | 422/180 |
| 4,353,873 | 10/1982 | Noritake et al. | 422/180 |
| 4,397,817 | 8/1983 | Otani et al. | 422/179 |
| 4,501,118 | 2/1985 | Thayer et al. | 422/171 |
| 4,581,206 | 4/1986 | Otani et al. | 422/171 |
| 4,629,605 | 12/1986 | Santiago | 422/179 |
| 4,735,046 | 4/1988 | Iwai | 60/295 |
| 4,848,082 | 7/1989 | Takahashi et al. | 60/285 |
| 4,900,282 | 2/1990 | Takahashi et al. | 60/302 |
| 5,293,743 | 3/1994 | Usleman et al. | 60/299 |
| 5,419,876 | 5/1995 | Usui et al. | 422/177 |
| 5,488,826 | 2/1996 | Paas | 60/299 |

FOREIGN PATENT DOCUMENTS

| | | |
|---|---|---|
| 2345383 | 9/1973 | Germany . |
| 2509210 | 9/1976 | Germany . |
| 3736500 | 5/1989 | Germany . |
| 59-18092 | 1/1984 | Japan . |
| 60-36709 | 2/1985 | Japan . |
| 61-283713 | 12/1986 | Japan . |
| 62-185816 | 8/1987 | Japan . |

*Primary Examiner*—Thomas Denion
*Assistant Examiner*—Binh Tran
*Attorney, Agent, or Firm*—Armstrong Teasdale LLP

[57] ABSTRACT

A catalytic reactor for an internal combustion engine having a cooling jacket surrounding multiple catalyst elements. A thermal barrier layer is formed between the catalyst elements and the cooling jacket to prevent over cooling of the catalyst elements. The thermal barrier layer can be formed from insulating elements such as fibrous material, a plurality of annular rings disposed around the catalyst elements, a corrugated layer, or can be formed by an empty space.

19 Claims, 4 Drawing Sheets

CATALYTIC REACTOR FOR MARINE APPLICATION

BACKGROUND OF THE INVENTION

The present invention is directed to a catalytic reactor for processing an exhaust gases flow from an internal combustion engine, particularly in marine applications, of the type generally employing multiple catalyst elements.

In marine applications, where the engine is enclosed in a compartment, it is common practice to water cool the engine exhaust system to reduce the amount of heat radiated within the enclosure. The addition of a catalytic reactor to such an exhaust system significantly increases the heat within the system so adequate cooling becomes even more important. A problem is that the catalyst element must be maintained at a high enough temperature to sustain catalytic reaction. There is disclosed in U.S. Pat. No. 4,735,046 (Iwai), U.S. Pat. No. 4,848,082 (Takahashi et al.), and German Reference DE 3736500 the use of an insulation gap between the catalyst of a marine engine and a water cooling jacket.

The object of the present invention is to provide an improved thermal barrier between the cooling water and the catalyst element to prevent overcooling the catalyst element and to relieve the thermal shock caused by the extreme temperature difference between the catalyst element, which can be very hot under some engine conditions, and the relatively cold water used as a coolant.

SUMMARY OF THE INVENTION

According to the invention a thermal barrier layer is formed between the catalyst elements and the cooling jacket.

The catalytic reactors in marine applications commonly have a cooling jacket that forms a longitudinal passageway. The longitudinal passageway is connected to an exhaust inlet, which conveys exhaust from the internal combustion engine, at a first end and connected to an exhaust outlet, at a second end. The catalyst elements are disposed inside the longitudinal passageway. A cooling passageway is formed within the cooling jacket. The cooling passageway is connected to a liquid coolant inlet and a liquid coolant outlet for circulating liquid coolant. A liquid coolant pump can be connected to the liquid coolant inlet. In marine applications the liquid coolant employed is generally water drawn from the body of water in which the vessel is located.

In a first set of embodiments the thermal barrier layer comprises an insulating element that is disposed in the region between the catalyst elements and the cooling jacket. The insulating element is chosen from the group comprising: fibrous material, a plurality of rings encircling the catalyst elements, and a corrugated material.

In the first set of embodiments the catalytic reactor is made by forming a longitudinal passageway from an inner jacket. The inner jacket is connected to an exhaust inlet at a first end and connected to an exhaust outlet at a second end. The catalyst element is then disposed inside the longitudinal passageway. The inner jacket is surrounded with an outer jacket. A cooling passageway is formed between the inner jacket and the outer jacket. Then the cooling passageway is connected to a liquid coolant inlet to a liquid coolant outlet. Finally a thermal barrier layer comprising an insulating element is formed between the at least one catalyst and the inner jacket.

In a second set of embodiments, a shell, that restricts air flow between the catalyst elements and the thermal barrier layer, encases the catalyst elements. The shell is connected at or substantially near it's ends to the cooling jacket. The cooling jacket is formed from an outer jacket that surrounds an inner jacket. The inner jacket and the outer jacket cooperate to form a cooling passageway in between them. The thermal barrier layer is formed between the shell and the inner jacket. The empty space which comprises the thermal barrier layer can be utilized in various modes. The thermal barrier layer can form a dead air space or can be connected to a source of cooling air.

As pointed out in greater detail below the catalytic reactor of this invention provides the important advantages of a thermal barrier layer between the catalyst elements and the cooling jacket in order to prevent overcooling the catalyst elements and further to relieve the thermal shock caused by the extreme temperature difference between the catalyst element, and the liquid coolant.

The invention itself, together with further objects and attendant advantages, will best be understood by reference to the following detailed description taken in conjunction with the accompanying drawings.

DESCRIPTION OF THE PREFERRED EMBODIMENTS

Figure 1:
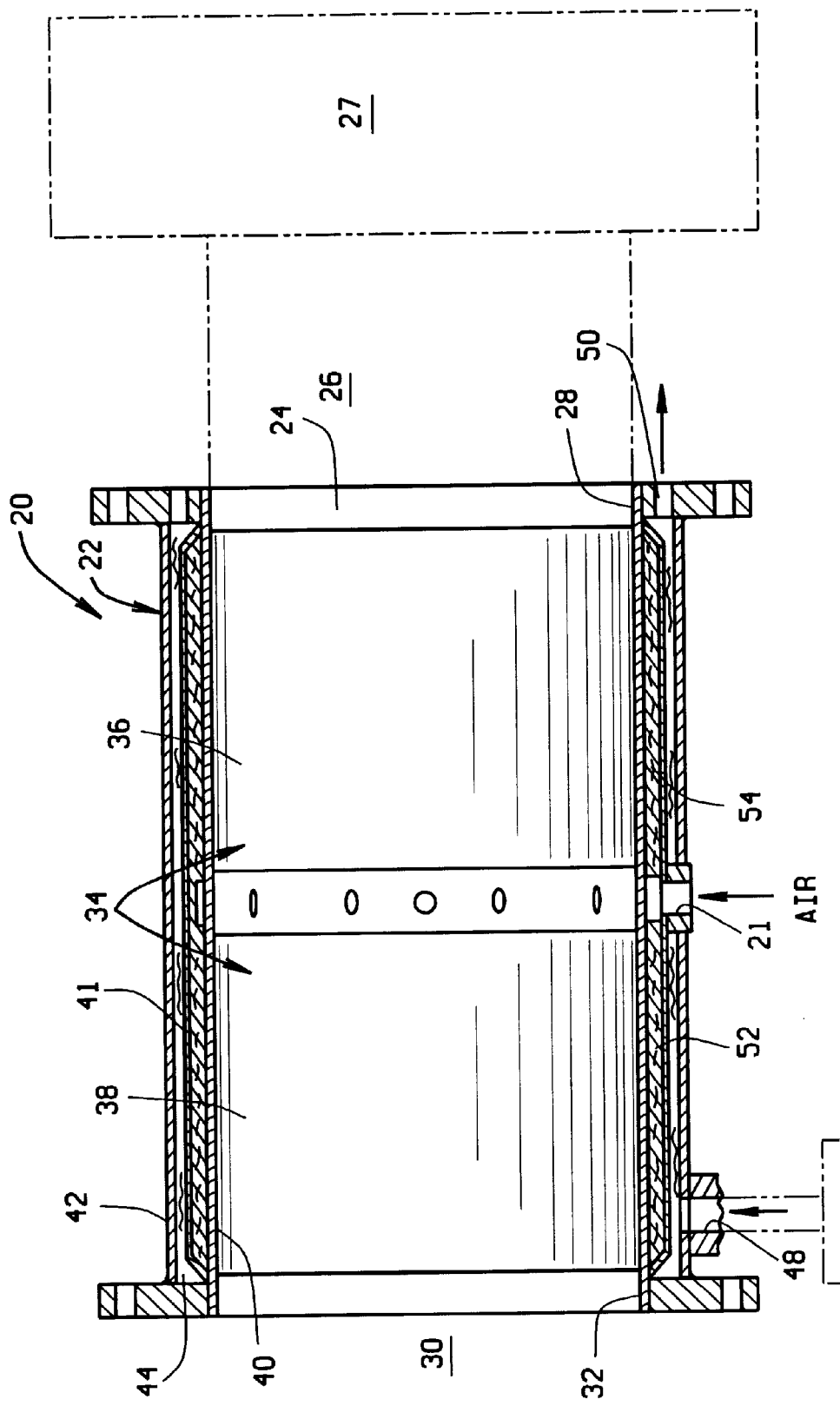
FIG. 1 illustrates a catalytic reactor of the present invention utilizing a fibrous material to form a thermal barrier.

Turning now to the drawings, FIG. 1 shows a first embodiment of a catalytic reactor 20 of the invention. The catalytic reactor 20 of FIG. 1 comprises a cooling jacket 22 which forms a longitudinal passageway 24. The cooling jacket 22 is connected to an exhaust inlet 26, which conveys exhaust gas flow from an internal combustion engine 27 (illustrated by block), at a first end 28 and is connected to an exhaust outlet 30, at a second end 32. A catalyst element, or multiple catalyst elements 34 are disposed inside the longitudinal passageway 24.

Typically, a first catalyst element 36 is disposed closer to the exhaust inlet 26 and that acts as a reducing element a second catalyst element 38 that catalyst element acts as an oxidizing element, is disposed downstream of the first catalyst element 36. Supplemental air is normally supplied in between the catalyst elements 36,38 to provide additional oxygen to assist in promoting the oxidization or reaction of the exhaust gas in the second catalytic element 38.

Figure 4:
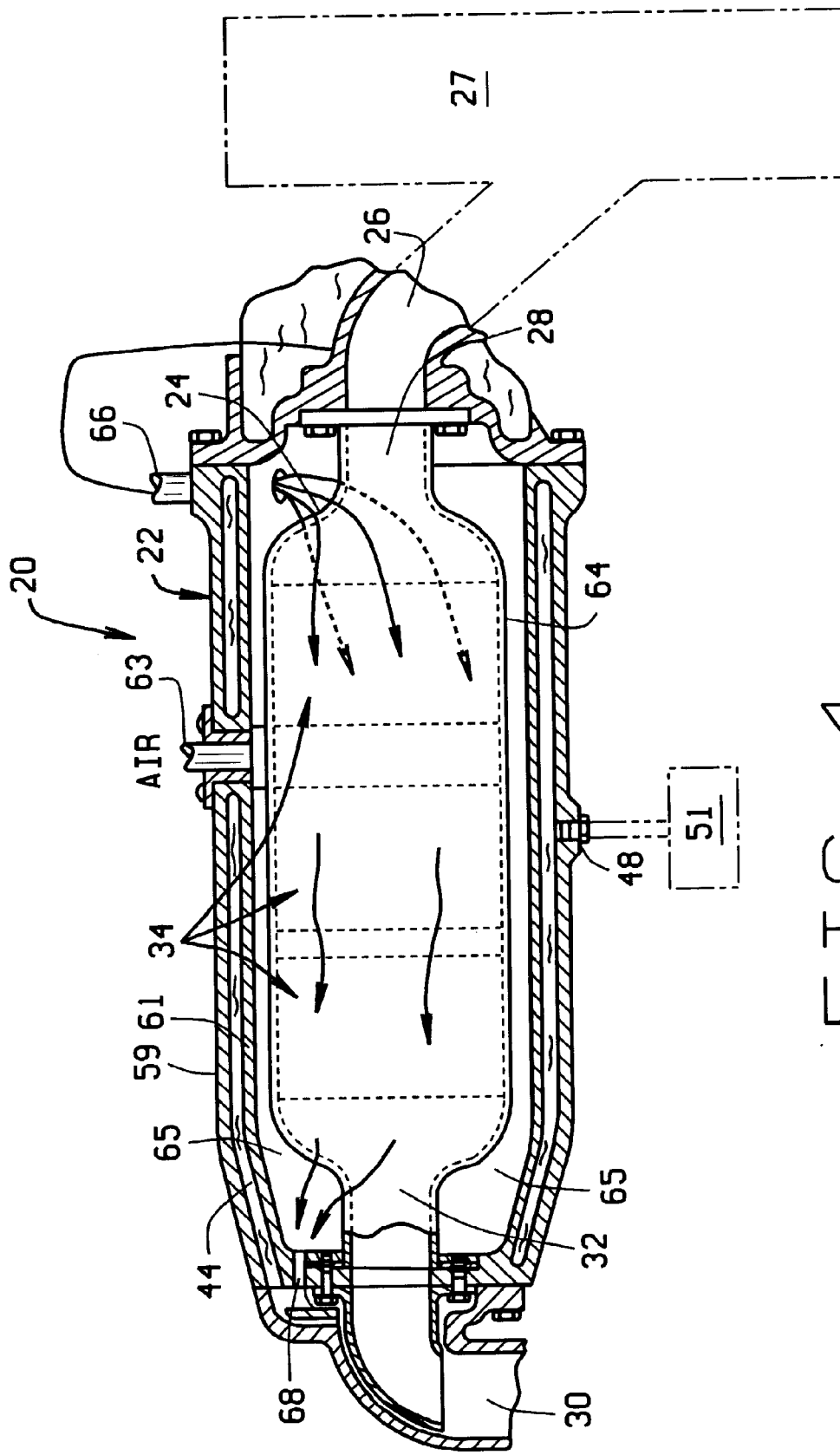
FIG. 4 illustrates a catalytic reactor of the present invention utilizing cooling air to form a thermal barrier.

As illustrated in FIG. 1, the cooling jacket 22 is preferably formed from an inner jacket 40 and a surrounding outer jacket 42 that are coupled to each other. The inner jacket 40 and the outer jacket 42 cooperate to form a cooling passageway 44 between them. Alternatively, the cooling jacket 22 can be formed from an integral single jacket 46 (as shown in FIG. 4) with an internal cooling passageway.

The cooling passageway 44 is connected to a liquid coolant inlet 48 and a liquid coolant outlet 50 for circulating liquid coolant. A liquid coolant pump 51 (illustrated by block) can be connected to the liquid coolant inlet 48. In marine applications, the liquid coolant employed is generally water drawn from the body of water in which the vessel is located.

A thermal barrier layer 52 is formed between the catalyst elements 34 and the cooling jacket 22. The thermal barrier layer 52 comprises an insulating element 54 that is disposed in the region between the catalyst element 34 and the cooling jacket 22.

In the FIG. 1 embodiment of the invention, the insulating element 54 comprises a fibrous material 56. The fibrous material 56 comprises an insulative "cloth" or "felt" formed from fibers which can withstand high temperatures such as metal fibers or ceramic fibers. An additional advantage obtained from the use of fibrous material 56 is that as a semi-elastic material it serves to accommodate the expansion or growth of the catalyst elements 34, as well as to isolate such elements from mechanical shock.

The fibrous material 56 is preferably impervious to the exhaust gas flow to prevent diversion of the exhaust gas around the catalyst elements 34. A small exhaust gas flow could probably be tolerated, but if not, or if the fibrous material is not impervious to exhaust gas flow, an alternative is to provide a shell (not shown) around the catalyst elements 34 to provide a positive seal independent of the fibrous material 56.

Figure 2:
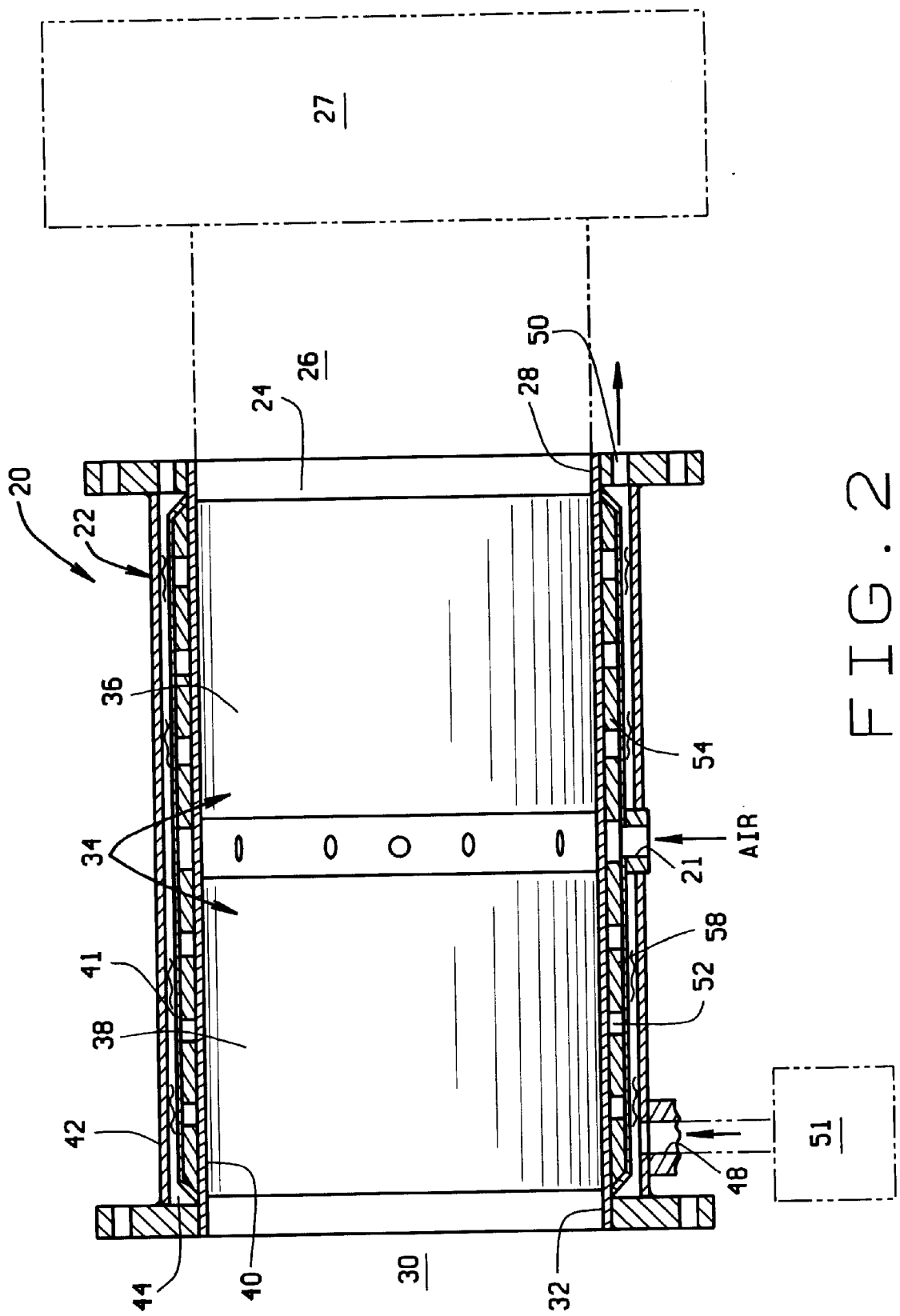
FIG. 2 illustrates a catalytic reactor of the present invention utilizing a plurality of annular rings to form a thermal barrier.

FIG. 2 illustrates another embodiment of the invention in which the insulating element 54 comprises a plurality of rings 58 encircling the catalyst elements. The plurality of rings 58 constrain the catalyst elements 34 within the cooling jacket 22. The plurality of rings 58 reduce the area of thermally conductive contact between the catalyst elements 34 and the cooling jacket 22 thereby limiting the thermal transfer between the catalyst elements 34 and the cooling jacket 22. The plurality of rings 58 also prevent any significant flow of exhaust gas between the catalyst elements 34 and the cooling jacket 22. The material of construction of the plurality of rings 58 is preferably metal.

Figure 3:
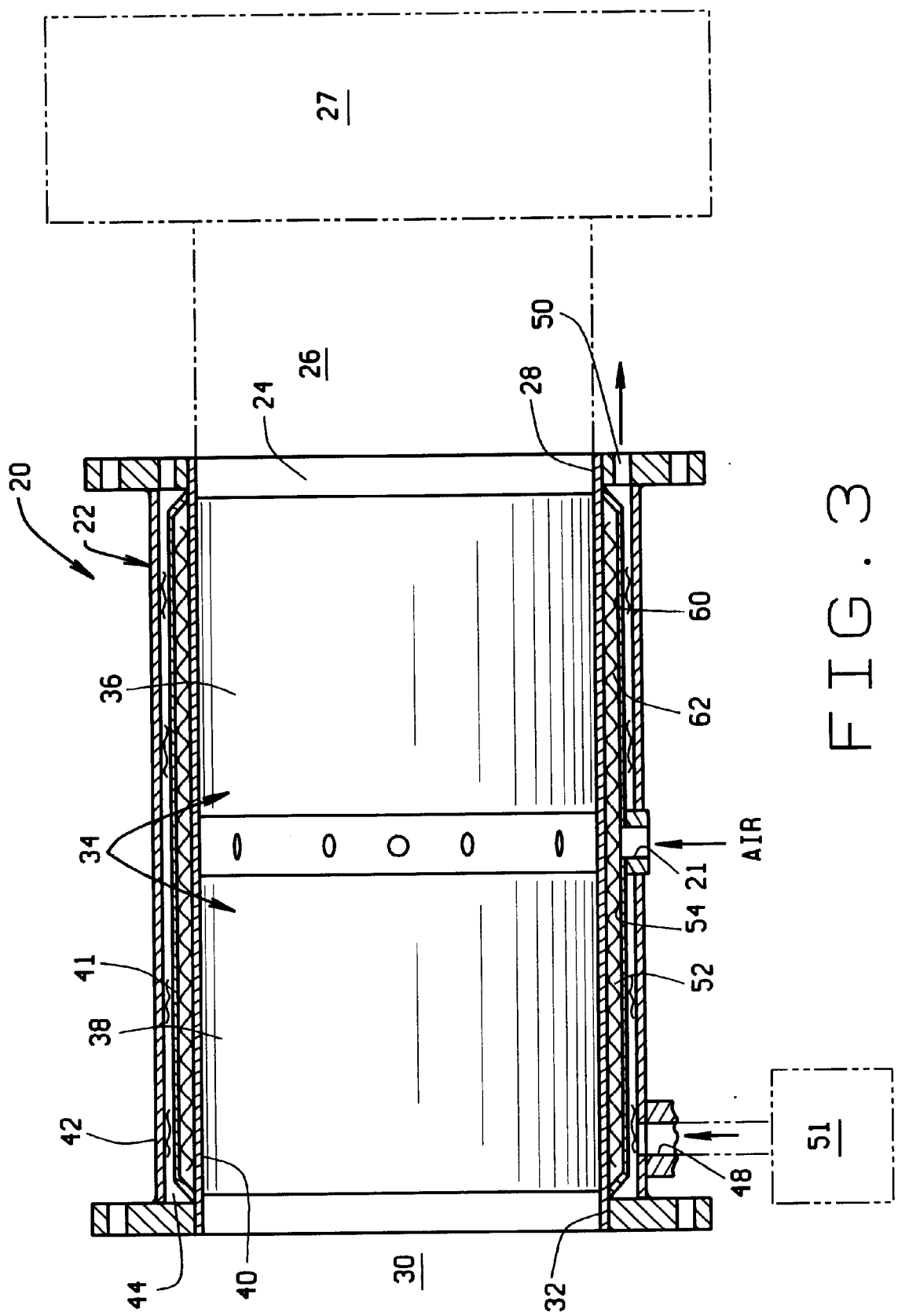
FIG. 3 illustrates a catalytic reactor of the present invention utilizing a corrugated layer to form a thermal barrier.

FIG. 3 illustrates a third embodiment of the invention in which the insulating element 54 comprises a corrugated layer 60. The corrugated layer 60 limits the heat transfer between the catalyst elements 34 and the cooling jacket 22 and also provides a support for the catalyst elements 34 that can accommodate expansion or growth of the catalyst elements 34 within the cooling jacket 22.

The corrugations 62 of the corrugated layer 60 can be arranged to run circumferentially around the catalyst elements 34 so that no exhaust gas is able to flow through the corrugations 62 and thus bypass the catalyst elements 34. Alternatively, the corrugations 62 of the corrugated layer 60 can be arranged to run longitudinally along the catalyst elements 34 parallel to the flow path of the exhaust gas, requiring a seal independent of the corrugation layer (not shown) to block the flow of the exhaust gas. The preferred construction material of the corrugated layer 60 is preferably metal.

FIG. 4 illustrates a fourth embodiment of the invention where a shell 64 encases the catalyst elements 34. The shell 64 is attached to the cooling jacket 22 at or substantially near its ends 28,32. The thermal barrier layer 52 is formed by an empty space 65 between the shell 64 and the cooling jacket 22. The shell 64 restricts air flow between the catalyst elements 34 and the thermal barrier layer 52.

The empty space 65 that comprises the thermal barrier 52 can be configured in alternative ways to create different levels of thermal insulation.

As illustrated in FIG. 4, the thermal barrier layer 52 in this embodiment is connected to a cooling air inlet 66 and connected to a cooling air outlet 68 for circulating cooling air through the thermal barrier layer 52. The cooling air circulated through the thermal barrier layer 52 can be independent of air supplied to the catalyst elements 34 to promote reaction or alternatively it could be pulled through by an air pump (not shown) which supplies the supplemental air. The cooling air outlet 68 can be connected to a recirculation system (not shown) or it can be vented into the exhaust flow downstream of the catalyst elements 34.

In a variation to this embodiment the thermal barrier layer 52 may be vented to the exhaust flow at either end so that it will fill with exhaust gas (not shown). The exhaust gas will be stagnant therefore it will provide an insulating layer of exhaust gas at a temperature lower than that of the flowing exhaust gas.

A further variation is to seal off the thermal barrier layer forming an insulating dead air space.

The catalytic reactor of this invention provides the important advantages of a thermal barrier layer between the catalyst elements and the cooling jacket in order to prevent overcooling the catalyst elements and further to relieve the thermal shock caused by the extreme temperature difference between the catalyst element, and the liquid coolant.

The present invention can be practiced with a single catalyst element or multiple elements.

Of course, it should be understood that a wide range of changes and modifications can be made to the preferred embodiment described above. It is therefore intended that the foregoing detailed description be understood that it is the following claims, including all equivalents, which are intended to define the scope of this invention.

What is claimed is:

1. A catalytic reactor system comprising:

an inner cooling jacket and an outer cooling jacket;

a catalyst element disposed within said inner cooling jacket;

a first end adapted to be connected to an exhaust conduit from an internal combustion engine for receiving an exhaust gas and a second end adapted to be connected to a conduit for passing the exhaust gas after contact with said catalyst element;

a cooling passageway between said outer cooling jacket and said catalyst element, said cooling passageway comprising a cooling air inlet;

a thermal insulative space between said inner cooling jacket and said outer cooling jacket; and a thermal insulative material disposed in said insulative space, said thermal insulative material being semi-elastic, generally restrictive to exhaust gas flow and supportive of said catalyst element.

2. A system as claimed in claim 1 including:

said thermal insulative material is metal fibers.

3. A system as claimed in claim 1 including:

said thermal insulative material is a plurality of metal rings.

4. A system as claimed in claim 3 wherein:

said metal rings are spaced from one another.

5. A system as claimed in claim 1 wherein:

said thermal insulative material is corrugated.

6. A catalytic reactor system comprising:

a cooling jacket comprising an inner member and an outer member;

a catalyst element disposed within said cooling jacket;

said cooling jacket having two ends, a first end adapted to be connected to an exhaust conduit from an internal combustion engine for receiving an exhaust gas and a second end adapted to be connected to a conduit for passing said exhaust gas after contact with said catalyst element;

a thermal insulative space between said cooling jacket outer member and said catalyst element; and a thermal insulative element extending along the entire longitudinal length of said catalyst element, said thermal insulative element positioned within said thermal insulative space and comprising flowing air from an inlet location upstream of said catalyst element, in relation to exhaust gas flow, to an outlet location downstream of said catalyst element.

7. An apparatus as claimed in claim 6 wherein:
said catalyst element is enclosed in a shell.

8. An apparatus as claimed in claim 6 wherein: said thermal insulative element further comprises metal fibers.

9. An apparatus as claimed in claim 6 wherein: said thermal insulative element further comprises a plurality of spaced metal rings.

10. An apparatus as claimed in claim 6 wherein: said thermal insulative element further comprises a corrugated metal.

11. An apparatus as claimed in claim 6 wherein: said thermal insulative element further comprises a semi-elastic material, generally restrictive to exhaust gas flow and supportive of said catalyst element.

12. A catalytic reactor system configured to be connected to an exhaust conduit from an internal combustion engine for receiving an exhaust gas, said catalytic reactor system comprising:

a cooling jacket comprising an inner cooling jacket and an outer cooling jacket;

a catalyst element disposed within said inner cooling jacket;

a cooling passageway between said outer cooling jacket and said catalyst element, said cooling passageway comprising a cooling air inlet;

a thermal insulative space between said outer cooling jacket and said inner cooling jacket; and a thermal insulative material disposed in said insulative space.

13. A catalytic reactor system in accordance with claim 12 wherein said thermal insulative material extends along an entire longitudinal length of said catalyst element.

14. A catalytic reactor system in accordance with claim 13 wherein said thermal insulative material comprises metal fibers.

15. A catalytic reactor system in accordance with claim 13 wherein said thermal insulative material comprises a plurality of metal rings.

16. A catalytic reactor system in accordance with claim 13 wherein said thermal insulative material is corrugated.

17. A catalytic reactor system in accordance with claim 13 wherein said thermal insulative space extends between said outer cooling jacket and said thermal insulative material.

18. A catalytic reactor system in accordance with claim 17 wherein said thermal insulative material is semi-elastic, generally restrictive to exhaust gas flow and supportive of said catalyst element.

19. A catalytic reactor system in accordance with claim 12 wherein said thermal insulative material is semi-elastic, generally restrictive to exhaust gas flow and supportive of said catalyst element.

* * * * *